United States Patent Office 3,730,893
Patented May 1, 1973

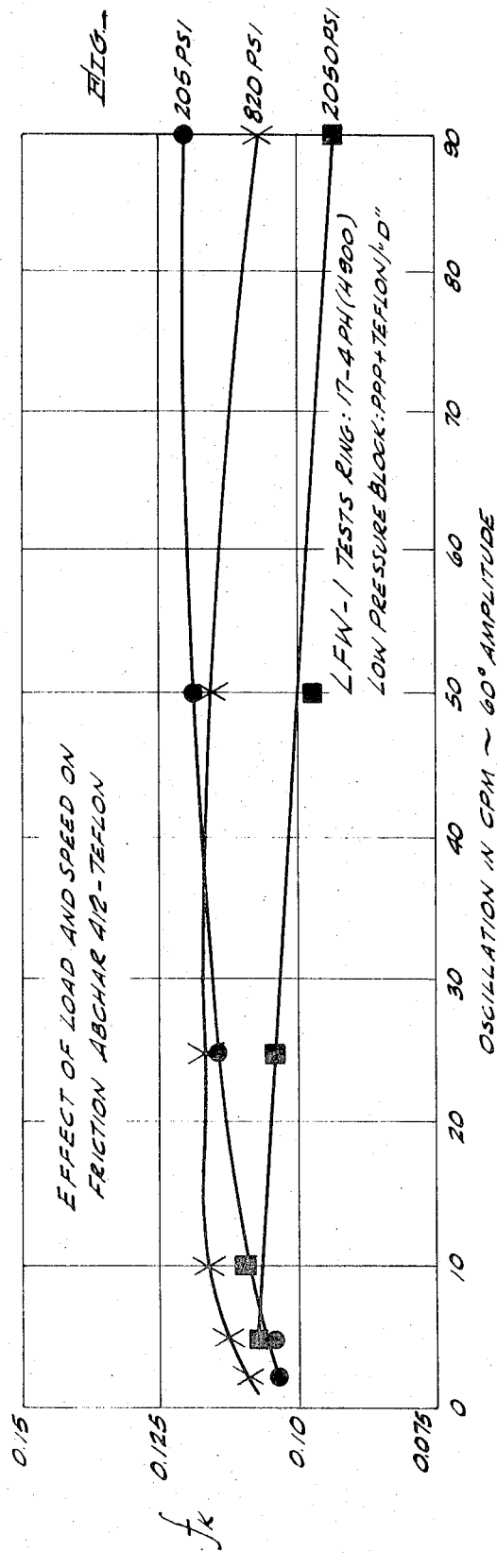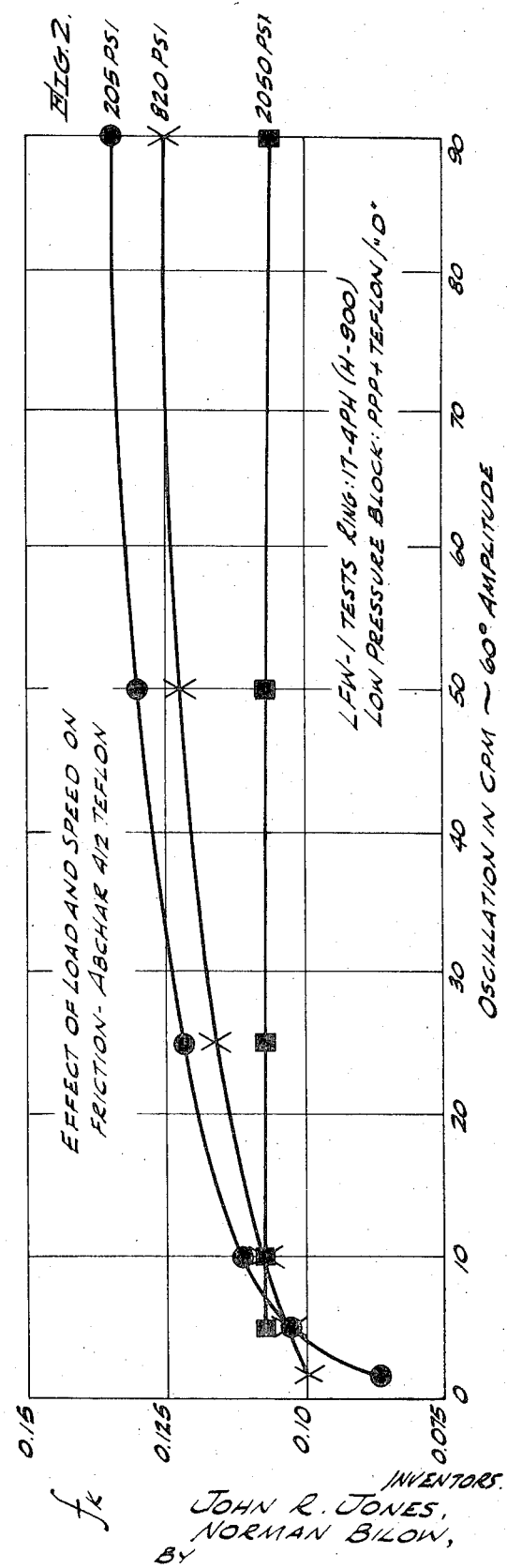

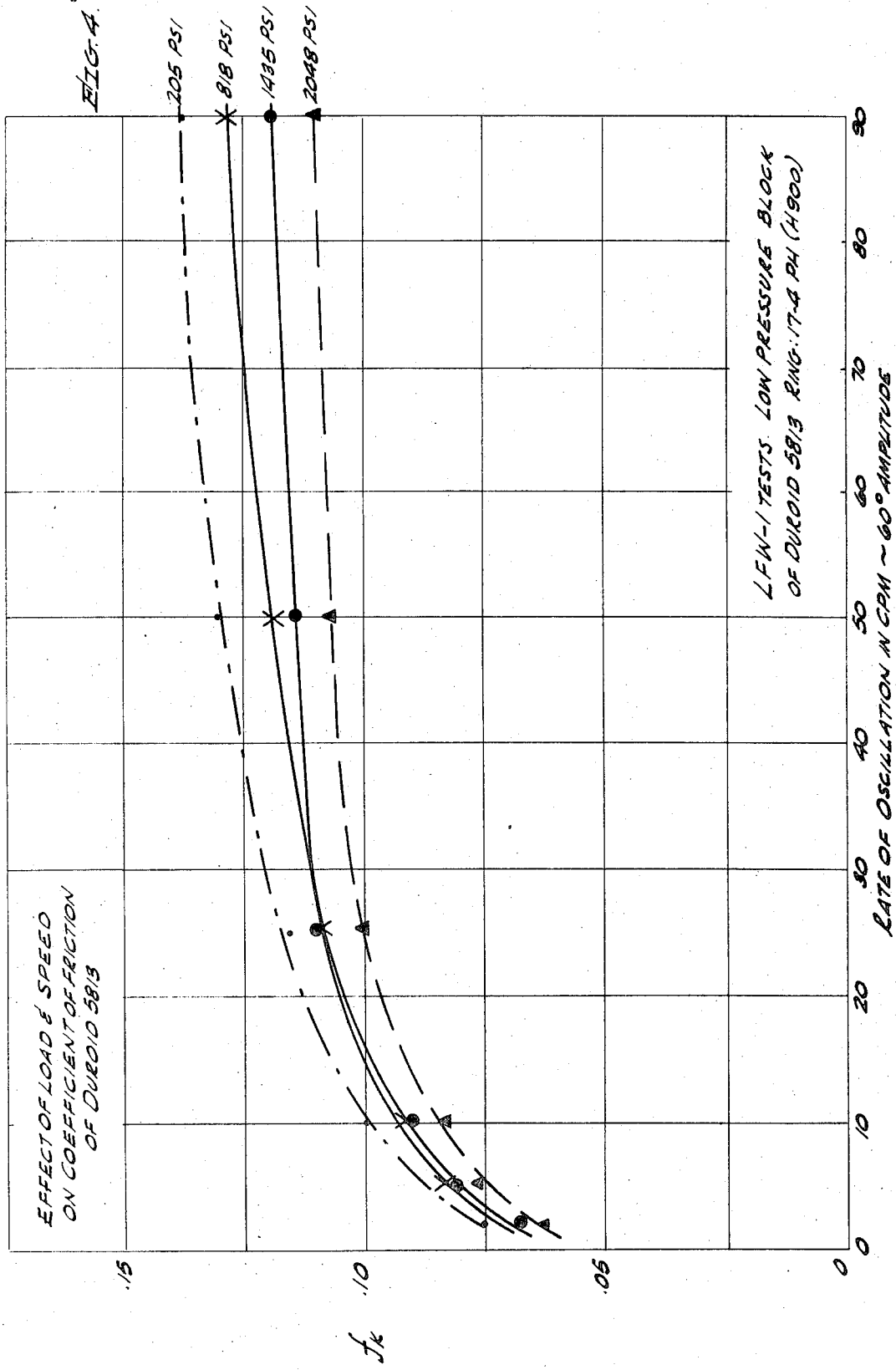

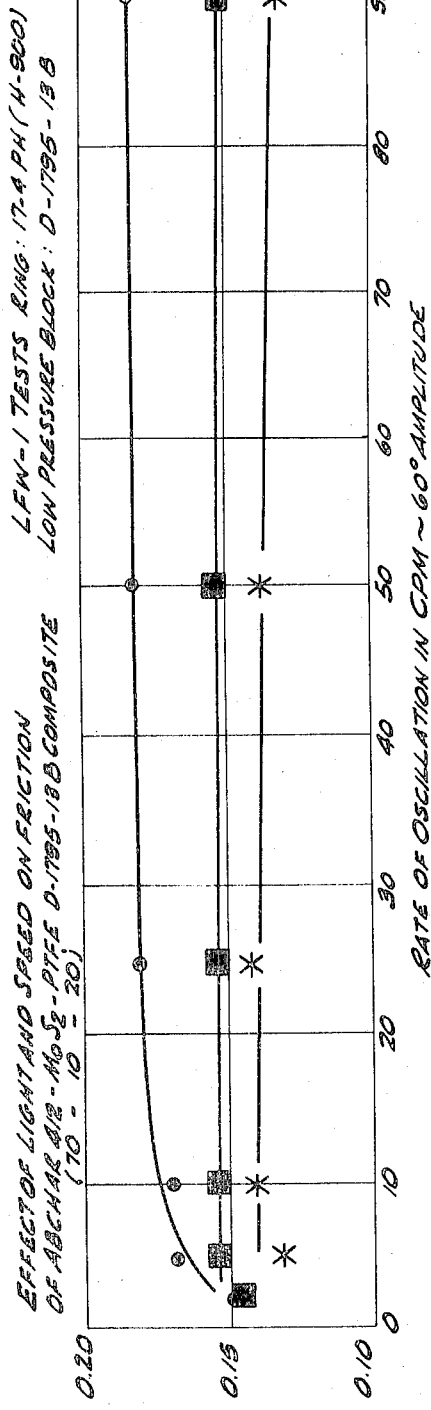
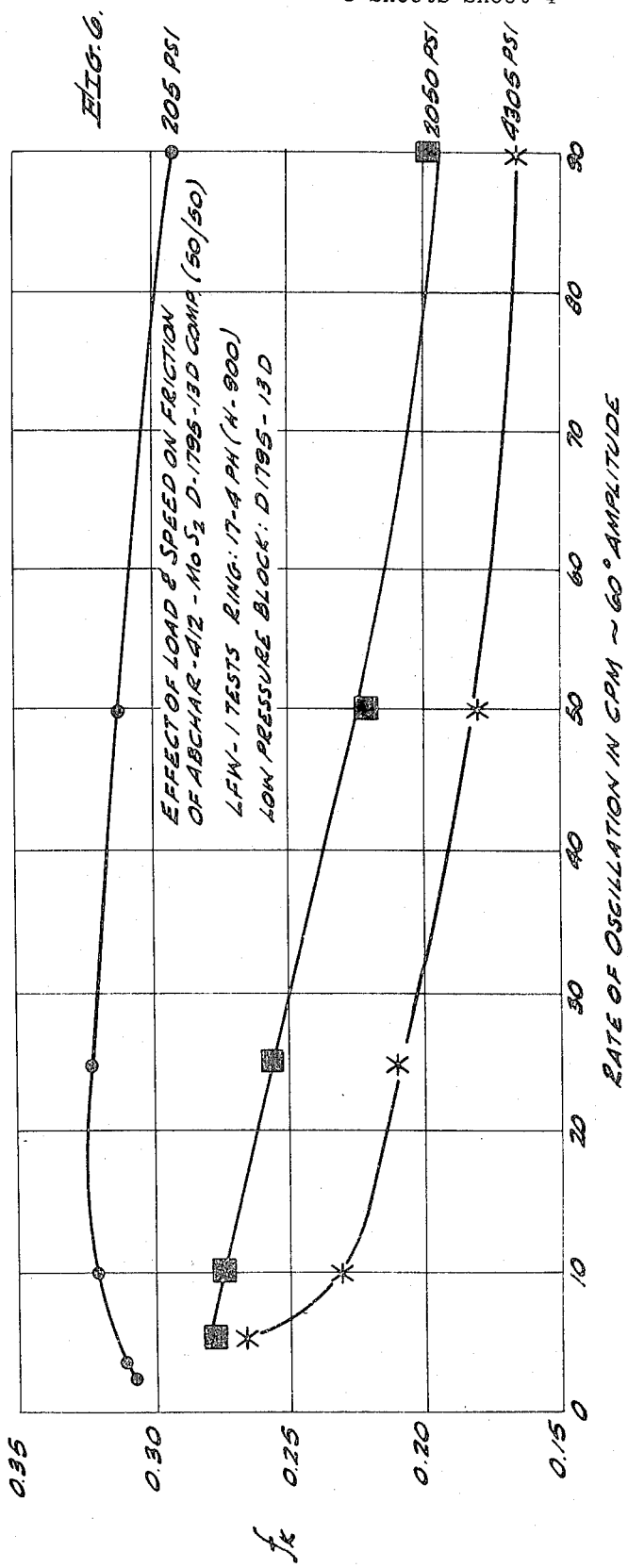

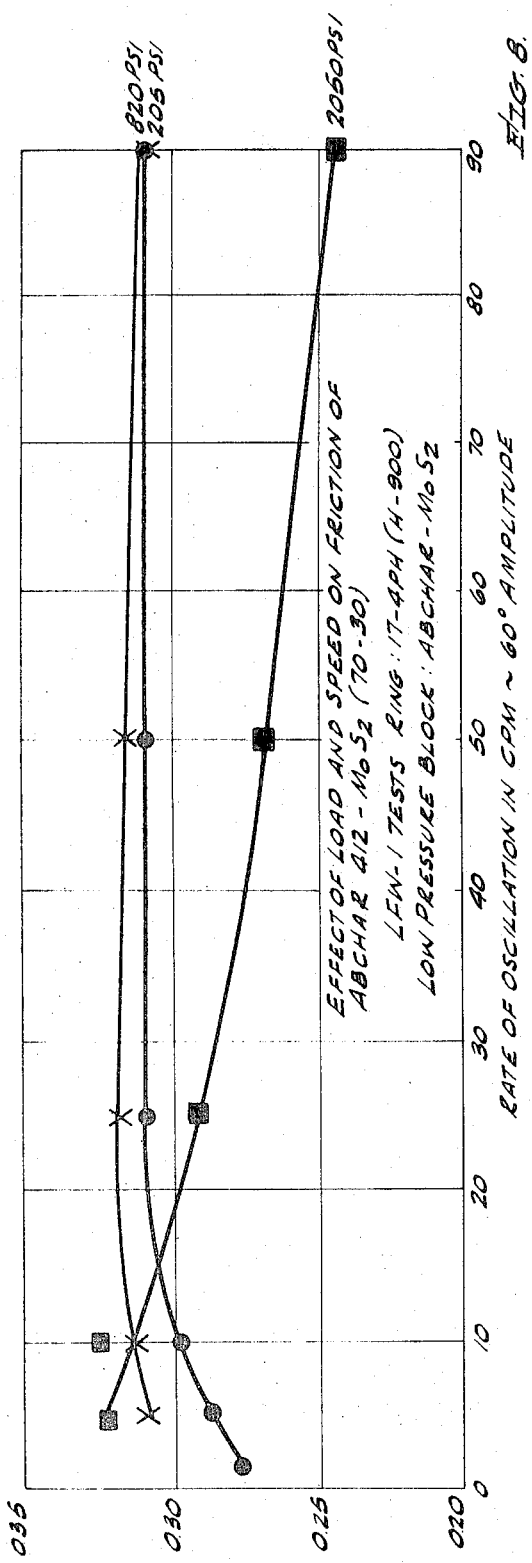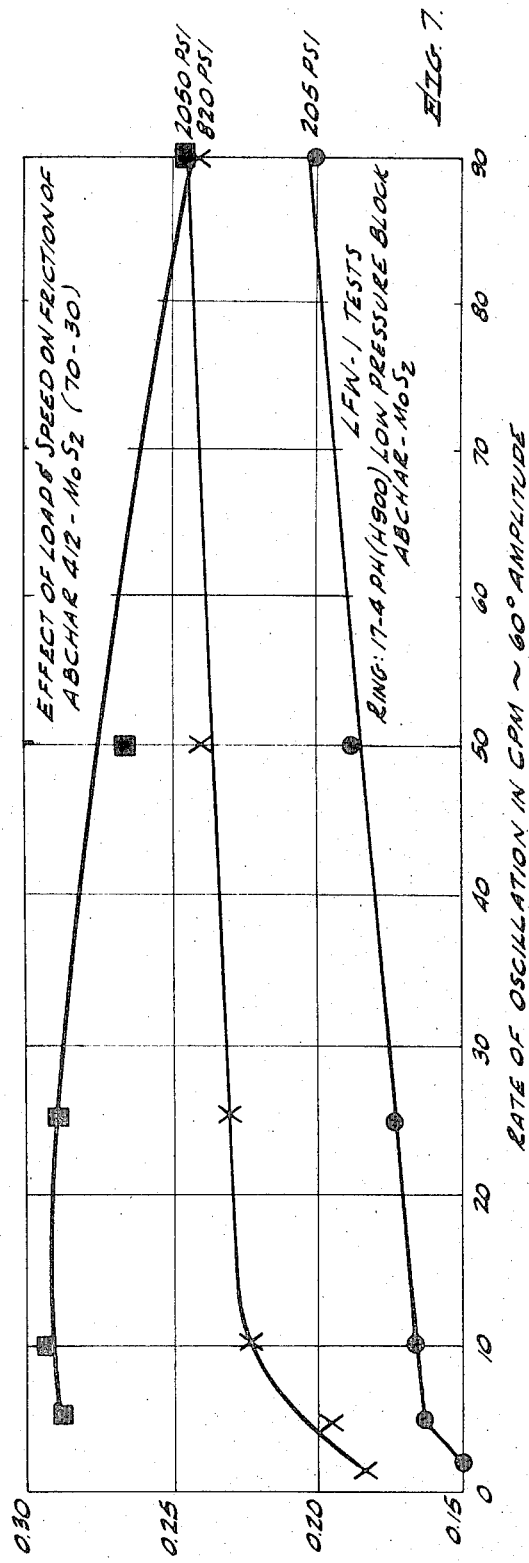

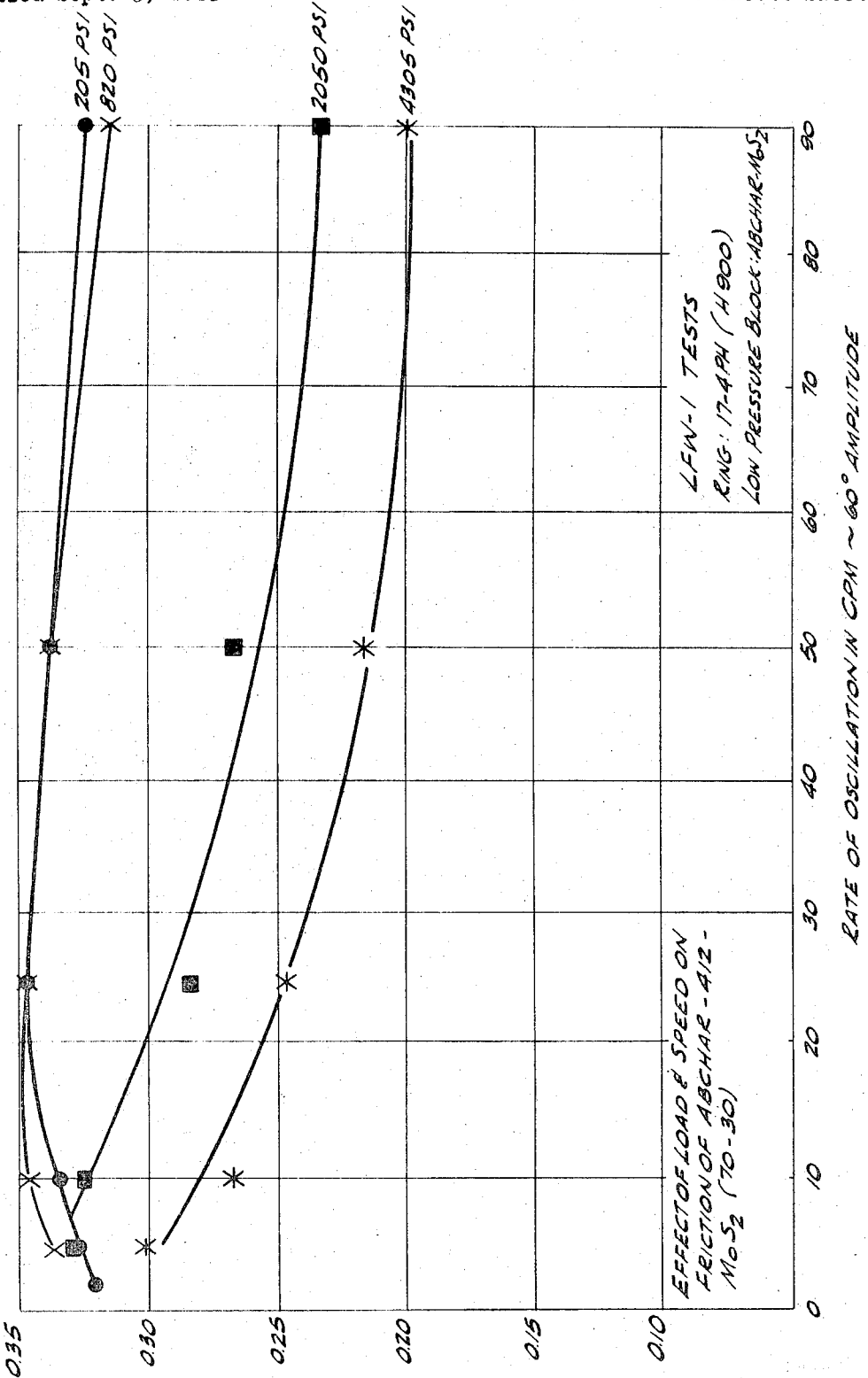

3,730,893
SOLID LUBRICANTS AND METHOD
Norman Bilow, Los Angeles, and John R. Jones, Pacific Palisades, Calif., assignors to Hughes Aircraft Company, Culver City, Calif.
Filed Sept. 3, 1968, Ser. No. 756,799
The portion of the term of the patent subsequent to Feb. 1, 1989, has been disclaimed
Int. Cl. C10m 7/28, 7/04
U.S. Cl. 252—12.4                           12 Claims

ABSTRACT OF THE DISCLOSURE

Improved thermosetting bonded solid lubricants comprising essentially a polymer resin of over 90% carbon and preferably polyphenylene polymers of at least about 94% carbon bonding of solid lubricant particulates, compositions therefor and method.

---

This invention relates to curable and cured composition combinations of heat stable resinous organic-bonded solid lubricants with improved adhesion or cohesion and methods of preparation thereof. More particularly, the invention relates to our discovery in providing improved heat stable organically bonded solid lubricants operable under dry conditions and comprised of cured polymerized polyphenylene-bonded lubricant powder, as improved bearing composites and improved bonded solid lubricants.

Heretofore, resin materials based on phenolics, epoxies and the like have been used. Such materials have limited thermal stability ($\simeq$500° F.), and otherwise decompose and deteriorate under high ambient or frictional temperatures. In addition, such known materials are subject to attack by detrimental environmental conditions. Several modifications have been attempted including the use of polyimide resin which is limited to 500° F. for extended periods and 600° F. for short periods in air. Otherwise, some bearing composites and bonded solid lubricants known to the art have high friction under ambient conditions, or do not work as dry lubricants under adverse conditions.

Thus, the resinous bonding of solid lubricants has been limited not only to obtaining lubricant bonding for combined or composite strength under pressure and friction, but also primarily to a question of friction coefficient or friction efficiency under all and abnormal conditions, as required for dry lubrication.

Otherwise, the only satisfactory dry solids lubricant for continuous operation at high temperatures (800° F.) has been a ceramic matrix for the dry lubricant. The combination for effecting a satisfactory resinous bonding of dry lubricant material for operation at high temperature, under frictional conditions was unknown.

Accordingly, the large temperature gap between the useful range of organic matrices and inorganic matrices for bonding solid lubricants, and affording improved stability to oxidation and thermal degradation with stability to friction conditions, has created several problems in the art. As indicated, among the problems in the field of self-lubricating bearing materials is friction coefficient, affected by speed and load, or pressure, under severe conditions of operation.

It is accordingly a principal object of this invention to provide the art with an improved heat-cured organic bonding agent in combination with solid lubricative material having greater cohesion and reduced friction under conditions of speed and pressure at any temperatures up to 800° F. and higher.

Another object of this invention is to provide the art with improved, strong, self-lubricating bearing materials of heat-cured polyphenylene polymers and dry powder lubricant for dry sliding surfaces under severe conditions of operation, such as cryogenic temperatures, higher temperatures (to well over 500° F. and to 700°–800° F. and higher), in ultra-high vacuum (below $10^{-8}$ torr) and under some normally and abnormally corrosive conditions.

Another object of this invention is to provide the art with thermally stable, superior bonded solid lubricants comprising thermoset polyphenylenes and thermally stable lubricative powders operable at temperatures to 80° F. and higher, providing self-lubricating composites and bonded solid lubricants of better wear resistance and lubricity at elevated temperatures under dry conditions than heretofore known to be possible without utilizing applicant's discoveries and teachings as provided herein.

An additional object of this invention is to provide the art with the improved combination of a cured resin polymer matrix having over 90% and preferably on the order of over 94% carbon by weight in combination with a dry lubricant compositions therefor and methods of preparation thereof.

Further and additional objects and advantages will be recognizable from the following description of exemplary preparations and mixtures in conjunction with the drawings wherein:

FIGS. 1, 2 and 3 are graphs illustrative of the friction coefficient or effect of speed and load on a combination of self-lubricating polyphenylene bonded polytetrafluoroethylene;

FIG. 4 is a comparative graph of the friction coefficient of a conventional self-lubricating composite;

FIGS. 5 and 6 are graphs illustrative of the coefficient of friction or effect of speed and load on the combination of heat-cured polyphenylene bonding other dry solid lubricant material;

FIGS. 7, 8 and 9 are further illustrative of the coefficient of friction of polyphenylene-bonded solid lubricant material.

Figure 3:
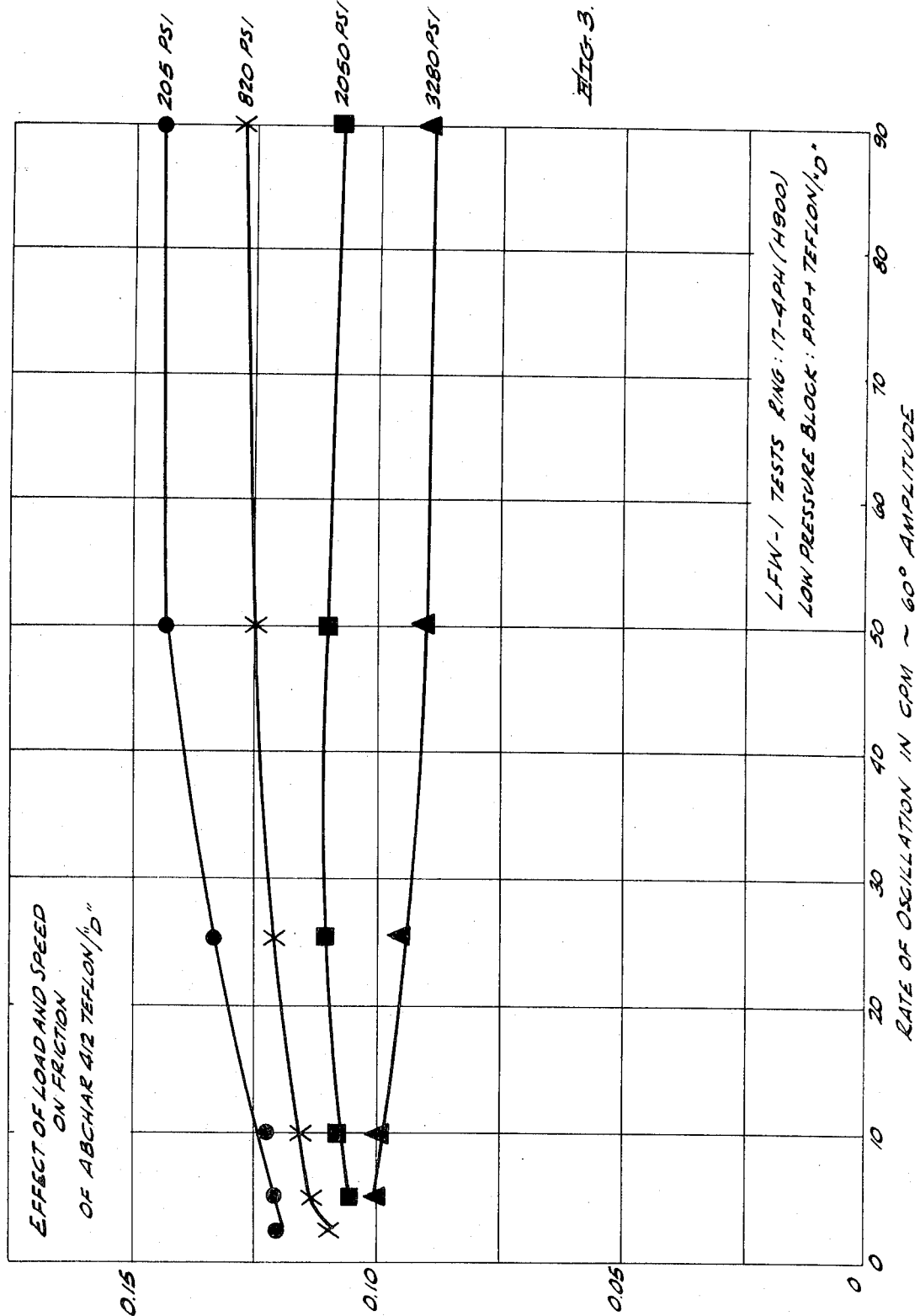

Herein provided is a combination of polymerized polyphenylene polymers containing bonded solid lubricant material and mixtures of same providing strong, solid thermoset dry self-lubricating bearing material applicable in molded or cured film form.

The curable polyphenylene material, prior to cure, has a molecular weight in the range of 1000±500 to 3000 and may be indicated in a very general polymeric form as

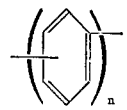

The para polymers are a completely intractable, infusible, and uncurable form of polyphenylene and are not to be confused with the soluble fusible polyphenylenes of the fully aromatic character as principally utilized herein. These preferred initially soluble polyphenylene polymers have a structure of the character illustrated as follows:

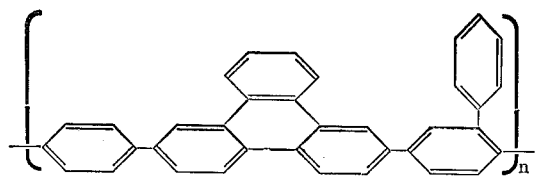

with an average carbon percent of preferably at least and over 94%.

The polyphenylenes are prepared by polymerizing monomers and/or polymers, and mixtures of the same selected from the group consisting of biphenyl, terphenyl, quaterphenyl, isomers thereof, anthracene, naphthalene, phenanthrene, mixtures thereof and mixtures thereof with other similar aromatic monomers and phenylene oligomers and polyphenyls with not more than 5 fused or non-fused aromatic rings. The useful polymer products essentially are solvent soluble heat curable polyphenylenes in combination with polyfunctional curing agents and lubricant material, as exemplified and identified by indication and illustration herein.

In general, the polyphenylene materials are prepared by oxidative cationic polymerization of fused and/or non-fused ring aromatic hydrocarbons or phenylenes, and particularly polymerizing the monomers and/or monomer mixtures with a combination of a strong anhydrous Lewis acid catalyst and an anhydrous oxidant or mixtures thereof of such other operable catalyst and oxidant combination. The reaction is effected at a temperature on the order of 100° C. to 135° C. and in the range of about 90° C. to not over about 170° C. for from a few minutes to a few hours. While initial polymerization may be effected at higher temperatures up to about 180° C., the lower temperatures are preferred. High reaction temperatures and long reaction periods raise the yield of higher molecular weight polymers. Generally 3–4 hours at 100°–120° C. produced satisfactory yields of chlorobenzene extractable polymers in the 1000–1500 molecular weight range. A heating period of 6–10 hours at 130°–150° C., produced soluble, fusible polymers in the 1800–2600 molecular weight range. As indicated, the most desirable polyphenylenes are soluble in chlorobenzene, chloroform, or equivalent solvent. The least desirable fraction of the raw polymer mass can first be removed by extraction with 10% by volume benzene—90% by volume naphtha mixture, or other suitable solvent, and then subjecting the residual polymers to extraction with chlorobenzene, or comparable solvent material and mixtures thereof, as hereinafter illustrated.

For example: In the synthesis of fusible polyphenylenes, from fused and non-fused phenyl monomers, or polymers, such monomers and/or polymers are mixed with an anhydrous oxidant such as cupric chloride and an anhydrous strong Lewis acid catalyst such as aluminum chloride, or ferric chloride, and the combination thereof is then copolymerized under limiting conditions. Typical non-limiting illustrations of the preparation of soluble, fusible, polyphenylene polymers are provided, as follows:

EXAMPLE I

One mole of m-terphenyl is melted at about 100° C. To this melt aluminum chloride (0.2–0.4 mole) and cupric chloride (about 1.0–1.8 moles) are gradually added and the original temperature of the reaction mixture is maintained with stirring until the evolution of HCl virtually ceases, or about 2–4 hours. The crude product is then thoroughly washed with hydrochloric acid, then with water, to remove the catalyst and oxidant. Although the crude dried solid product, after removal of catalyst and oxidant, is usable as such with a curing agent or in a solvent mixture therefor, it is preferred to grind and wash the solids of the reaction several times with from 6 N to 12 N hydrochloric acid and then with water to remove the inorganic material. Then, after drying, the crude product is preferably extracted with boiling benzene, mixtures of benzene and hexane, methanol, or a like solvent to remove unreacted monomer material and polymer material below the molecular weight of 500. Thereafter, the remaining solids are essentially all soluble in hot to boiling chlorobenzene, or other solvent as hot to boiling chloroform, trichloroethylene, tetrachloroethane, or other suitable solvent with which they are extractable, to isolate the preferred soluble polymers in the molecular weight range of about 1000±500 to 2500. This solution may be used with a curing agent in combination with lubricant material as herein described, or the solvent evaporated and the mixture of moldable solids utilized in the preparation of moldable lubricative composites.

EXAMPLE II

A mixture of m-terphenyl (230 g., 1.0 mole), biphenyl (77 g., 0.5 mole), benzene (55 g., 0.7 mole), and anhydrous cupric chloride (807 g., 6.0 moles) was prepared and heated to 165° C. in an oil bath. While stirring continuously, anhydrous aluminum chloride (187 g.) was gradually added to the reaction mixture over a two-hour period. The mixture was then cooled and pulverized, and additional aluminum chloride (67 g.) was added. It was then reheated at 165° C. for an additional 45 minutes.

The crude polymer was thoroughly cleaned by treatment with concentrated hydrochloric acid (12 N), then 6 N, then 12 N, or either or both, as desired. After drying, the polymeric product weighs 355 grams. Unreacted monomers and low molecular weight oligomers ($\approx$210 grams) were extracted from the crude polymer by continuous extraction with hot benzene. The lower molecular weight polymer fraction extracted by the benzene had a melting point of about 120°±20° C. Continuous extraction of the benzene-insoluble residue with hot bromobenzene, at and near its boiling point, yields polymer (69 g.) having a mean molecular weight of about 1500 and melting at 190–220° C. If 1,2,4-trichlorobenzene is used in the second extraction, however, the yield of extracted polymer is 90–100 grams, and the polymer has a mean molecular weight of about 2000, and melts at 220–350° C.

EXAMPLE III

Into a one-liter resin flask fitted with a high torque stirrer, hot oil bath, and gas inlet tube were placed naphthalene (128 g., 1.0 mole) and aluminum chloride (270 g., 2.0 moles), and the oil bath brought to 100–110° C. After solution was effected, anhydrous cupric chloride (26.9 g., 0.2 mole) was added over a ten-minute period. Oxygen was bubbled vigorously through the reaction mixture for approximately nine hours while the temperature was kept at 110–120° C. The reaction mixture was cooled, washed with concentrated hydrochloric acid then water, given a preliminary wash with naphtha and the crude polymer (125 g.) extracted with naphtha containing 15% by volume of benzene yielding 100 g. of naphtha insoluble polymer over 50% of which was soluble in the hot chlorobenzene and other solvents or mixture of solvent material therefor.

This insoluble portion then was extracted continuously with hot chlorobenzene yielding 50 g. of chlorobenzene soluble portion and 50 g. of chlorobenzene insoluble portion. An elemental analysis showed that relatively little oxygen had been incorporated into the polymer.

Twenty grams of the chlorobenzene soluble polymer fraction was dissolved in 50 ml. of boiling chlorobenzene. A curing agent solution was prepared by reacting 10 grams of 1,4-bis(hydroxymethyl)benzene with three grams of p-toluenesulfonic acid monohydrate in 100 ml. of chloroform at the boiling point. The curing agent preparation was carried out for about twenty hours while removing water with an azeotropic trap.

The polyphenylene solution prepared above and the curing agent were combined and heated at reflux for 20 hours. A portion of the reaction mixture was dried in vacuum. The dried product then was mixed with about 50% dry powder lubricant material and molded at 400° F. and 3,000 p.s.i. for two hours. It then was post-cured for 18 hours at 275° F., then heat programmed, in an inert atmosphere, for 108 hours from 275° F. to 550° F. and finally held for six hours at 550° F. In admixture with from 50% to 66% by weight lubricant powder, excellent molded shapes were secured which formed superior machinable dry bearing material.

EXAMPLE IV

Into a one-liter resin flask fitted with a stirrer, oil bath and gas inlet tube were placed 178 g. of anthracene, and 270 g. of aluminum chloride, and the oil bath brought to 110° C. The mixture was stirred vigorously and oxygen was bubbled rapidly through the reaction mixture for approximately 8½ hours while the temperature was kept at 115° C. The reaction mixture was cooled, washed with concentrated hydrochloric acid then with water, given a preliminary wash with naphtha and the crude polymer (170 g.) extracted with naphtha containing 15% by volume of benzene yielding 145 g. of insoluble polymer.

The insoluble portion then was extracted continuously with chlorobenzene yielding 120 g. of chlorobenzene soluble polymer and a residue of chlorobenzene insoluble material. The soluble extracted polymer is the portion preferably utilized with the curing agent and lubricant materials. However, for some applications, the insoluble portion may be retained and the mixture preferably pretreated by heating in a solvent material for the soluble, fusible polyphenylene polymers. The soluble polyphenylene polymers and solvent when heated with the higher molecular weight relatively insoluble portion preconditions or provides for a cured composite bonding of the lubricant particulate. Such lubricant may be added before, with, or after the curing agent addition, or the composite partially cured and the lubricant added to the composite incurable dry or solvent state.

The curing agent material with or without the initial addition of lubricant material, is added after the above partial polymerization. As an alternative, the entire mixture of the polyphenylene forming matrix consisting of the monomers or polymers, curing agent material and lubricant additive may be prepared in dry powder or dispersant solvent solution for subsequent polymerization and application in partially cured form for subsequently curing in film or molded form.

Curing agents as aromatic polymethylol compounds in combination with an acid polymerization catalyst, in monomer or polymer form may be used. For example, a polymethylol as xylylene glycol, combined with an organo-substituted mineral acid such as benzenesulfonic acid, naphthalene sulfonic acid, toluenesulfonic acid, ethanesulfonic acid, benzene phosphonic acid, benzene phosphinic acid, naphthalene phosphonic acid, including other alkyl and aryl sulfonic and phosphonic acids, ester and halide derivatives of same, sulfonyl halide and sulfonate esters, the strong halogenated and sulfonyl derivatives of carboxylic acid, mixtures thereof, and mixtures thereof with substituted or unsubstituted mineral acid material, as boric acid, phosphoric acid, and the like polymerizes the soluble and fusible polyphenylene monomers and polymers into a polymer matrix in combination with the dry solid lubricant material.

In addition, polyfunctional curing agents usable with curable soluble, fusible polyphenylenes, which are not dependent upon methylol groupings, as herein provided, are essentially aromatic sulfonic acids and aromatic sulfonyl halides. Such polyfunctional curing agents are illustrated by the following:

4,4'-biphenyldisulfonic acid,
m-benzenedisulfonic acid,
1,5-naphthalenedisulfonic acid,
1,3,5-benzenetrisulfonic acid,
2,7-anthraquinonedisulfonic acid,
3,8-pyrenedisulfonic acid,
2,4-toluenedisulfonic acid,
1,3,5-chlorobenzenedisulfonic acid,
4,4'-bibenzyldisulfonic acid,
1,3,5-chlorobenzenedisulfonic acid,
1,3,5-naphthalenetrisulfonic acid,
1,3,5,7-naphthalenetetrasulfonic acid,
3,5,8,10-pyrenetetrasulfonic acid,
diphenylether-4,4'-disulfonic acid,
4,4'-diphenylmethanedisulfonic acid,
biphenyldisulfonic acid, and the like. Further, corresponding aromatic sulfonyl halide derivatives, as sulfonyl chloride and sulfonyl bromide derivatives can also be employed. For example, one can use 1,3,5-benzenetrisulfonyl chloride, 4,4'-biphenyldisulfonyl bromide, m-benzenedisulfonyl bromide, and the like. Similarly aromatic compounds which have both sulfonic acid and sulfonyl chloride groups, for example: 4-chlorosulfonyl-4'-biphenylsulfonic acid, can also serve equally well as curing agents. Of the above, the sulfonyl chlorides as a class of curing agents, are preferred. For example, 1,3,5-benzenetrisulfonyl chloride, of the polyfunctional group, is most preferable as the curing agent for the polyphenylene polymers. This type curing agent more readily yields homogeneous blends with the polymers and effects curing of the aromatic polymer material when mixed therewith and heated at a lower temperature, on the order of 200° C., to effect final curing in providing thermosetting compositions of polyphenylenes and dry lubricant in molded and cast film forms of low volatility characteristics.

In preparation of the polyphenylene bonding material, in liquid form, solvent solutions of the polyphenylene polymers are preferably mixed with the soluble curing agent material, with or without the particulate lubricant initially included. Such mixtures may be initially prepared as a lubricant forming combination ready for spray or dip bonding application and curing, or partially cured and then mixed with the particulate lubricant, in the solvent or dry state, for application and curing in the spray, dip, or molded form.

Exemplary of non-limiting preparations of curing agent material are the following:

EXAMPLE V

Telomer I.—The 1,4-xylylene glycol was first recrystallized from benzene-ethanol since the commercial grade compound may vary in purity, and the impurities could cause a great deal of trouble. 1,4-xylylene glycol (benzenedimethanol, 35.0 grams, 0.253 mole) p-toluene sulfonic acid monohydrate (10.5 grams, 0.055 mole) and chloroform (350 milliliters) were mixed and heated at reflux for 20 to 24 hours while removing water azeotropically. The resulting solution was filtered. The product should be kept free from moisture or damp air because of the tendency to hydrolyze. After standing for several days at room temperature, a small amount of crystals generally formed. These readily redissolved upon warming.

EXAMPLE VI

Telomer II.—This modification used trichloroethylene as a solvent. In a typical preparation, recrystallized 1,4-xylylene glycol (30.0 grams) and p-toluene sulfonic acid monohydrate (9.4 grams) were dispersed in 330 milliliters of trichloroethylene. The mixture was heated under reflux for somewhat less than 6 hours or until water evolution ceased. The behavior and storage conditions of this solution is similar to that of Example I.

The soluble and fusible polyphenylenes in monomer and/or polymer form in combination with the curing agent material, in uncured or partially cured states, are mutually soluble in a dispersing solvent for the lubricant material. Whereas, the dry powder mixtures of polyphenylenes and lubricant may be prepared by mixing in the dry state, and molding, or partially cured, reground resolubilized for spray or dip application or cured in a molded form. The dispersant solvent effects a composite mixture providing a coating solution which affords the cured polyphenylene as a stable heat and pressure resistant matrix with intimately bonded lubricant material in solid particulate form. Such dispersant solvents as chloroform, mono, di-, or trihalogenated benzene, tetra and trichloroethylene, xylylene dioxane, toluene, tetrachloroethane, and mixtures of such dispersant solvent material are preferably utilized in preparation of the composite of soluble and fusible polyphenylene and particulate lubricant combination. From the dry mixed state, or fluid state, composites are provided as strong pressure resistant self-lubricating bearings or for providing sprayed on and cured self-lubricative surfacings capable of withstanding bearing pressure under ambient and abnormal conditions. The lubricant material is a thermally stable lubricative pigment or powder material as a fluorocarbon, e.g. polychlorotrifluoroethylene, polytetrafluoroethylene and the like, or $MoS_2$, $MoSe_2$, $WS_2$, $WSe_2$, $Sb_2O_3$, graphite, lead sulfide, or other lubricative particulates of the class of metal dichalcogenides, mixtures of the same, and the like having a long wear life preventing seizure and galling under adverse friction conditions of high temperatures.

Non-limiting examples of the preparation of polyphenylene curing compositions for bonding the solid lubricant are provided as follows:

EXAMPLE VII (1) Composition 412.—In a typical preparation, 20 grams of polyphenylene (chlorobenzene soluble, insoluble in 10 percent benzene (by volume) in naphtha, $\overline{M.W.}$ 1000±300) was dispersed in 60 milliliters of cold trichloroethylene. The mixture then was stirred under reflux to effect solution. Then, either a chloroform or a trichloroethylene solution of the 1,4-xylylene glycol curing agent, described in Example I and Example II, was added such that it contained 10 grams of the curing agent, as telomerized 1,4-xylylene glycol, and the mixture was heated at reflux for several to approximately 24 hours. This partially cured polyphenylene composition was used to prepare spray and dip lubricant composites, and in some cases, the solvent removed under reduced pressure and ambient temperatures to yield a molding powder in combination with a solid lubricant powder. The lubricant, in admixture therewith, may be added before or after removal of the solvent. When the lubricant material is to be added after removal of the solvent, the mixture is prepared by mixing in dry particulate granular form, and applicable to molding or redispersion in a suitable solvent for spray or dip application.

(2) Composition 413.—This modification involved the in-situ preparation of a matrix solution. A 500-milliliter round-bottom flask was fitted with a magnetic stirrer, glass mantel heater, water take-off for liquids heavier than water, and reflux condenser. Into the flask were added polyphenylene (M.P. 160 to 180° C., chlorobenzene soluble, $\overline{M.W.}$=1000+300, 45 grams), p-xylene glycol (15 grams), p-toluene sulfonic acid monohydrate (5 grams) and chloroform 300 milliliters). After the polyphenylene had a chance to slurry, the mixture was heated at reflux for 19 hours. Generally, approximately 1.6 milliliters of water was evolved. This solution was used for the fabrication of composites. Herein, the ratio of xylylene glycol to polyphenylene is 1:3.

(3) Composition 414.—A solution of polyphenylene polymers (chloroform soluble, M.W. 1000±300, M.P. 170±50, 40 g.) in chloroform (300 ml.) was blended with a solution of xylylene glycol telomer (specified Telomer I—Example V) such that 10 grams of xylylene glycol was used. The combined polyphenylene xylylene glycol solution was heated at reflux for 20 hours. This solution was then blended with molybdenum disulfide lubricant to produce the solid lubricative composites of this invention. Other powder lubricant material, as indicated, was blended with the solution to form spray compositions and molding powders. Herein, the ratio of xylylene glycol to polyphenylene is 1:4.

(4) Composition 913.—A solution of chloroform soluble dry polyphenylene ($\overline{M.W.}$ 900±100, 240 g.) and 1,3,5-benzenetrisulfonyl chloride (80 g.) was prepared by dissolving the two solids in chloroform (2 liters). The mixture then was heated at reflux for 5 hours before being blended with a lubricative material. The weight ratio of curing agent to polyphenylene is 1:3.

(5) Composition 1112.—A solution of polyphenylene (62 g., $\overline{M.W.}$ 900±100, M.P. 140–200° C.) in chloroform (600 ml.) was dried azeotropically. Pure 4,4'-biphenyldisulfonyl chloride (31 g.) then was added and the mixture was heated at reflux for 16½ hours. Upon filtration, very little insoluble residue remained. This solution was used to prepare composite lubricants by the addition of various solid lubricants. The preferred weight ratio of curing agent to polyphenylene is in the approximate range of 1:2 to 1:3, although this may be altered somewhat dependent upon the particular composition or combination with reference to its application as a bearing surface. Thus, with or without other lubricant material, the matrices, as provided herein, are applicable to bonding of such and known lubricant solids material as may require additional lubrication. Such composites can vary in pigment/resin ratio from about 50% to about 95% binder and down to about 30% binder dependent upon the density of the solid lubricant and their respective weight and volume factors. The preferred range for bonded solid lubricant (spray) is on the order of about 50% to 70% lubricant; the preferred range for the composite is from about 30% to 70% lubricant, by weight. In addition, reinforcing fibers in the nature of resin fibers (halohydrocarbon), glass fibers, potassium titanite fibers, graphite fibers, boron nitride fibers, and the like fibers or fillers, in the order of from about 1% to about 40% by weight or volume can be incorporated for some applications of use.

Further non-limiting examples of the preparation of polyphenylene lubricant composites or bonded lubricants are provided as follows, percentages are on a weight bases:

LUBRICANT PREPARATIONS

EXAMPLE VIII

| | Percent |
|---|---|
| Hughes composition 412 polyphenylene (by weight) | 70 |
| (Teflon) TFE fluorocarbon powder (lubricant) | 30 |

The lubricant powder is dispersed in a chloroform solution of the polyphenylene in a high speed blender and, for molding, the solvent is removed by evaporation. The resulting solid is ground to powder form, shaped to bearing form, and then cure molded under pressures of from 500 p.s.i. to 3,000 p.s.i. at temperatures of 350° F. to 450° F. The solution mixtures of the above, and other like or comparable lubricant mixtures, are applicable to single or multiple spray or dip applications and curing by single or intermittent heat treatment, with or without pressure.

EXAMPLE IX

| | Percent |
|---|---|
| Hughes composition 412 polyphenylene | 60 |
| Teflon TFE fluorocarbon powder | 40 |

The composite is prepared as in Example VIII, above.

EXAMPLE X

| | Percent |
|---|---|
| Composition 412 polyphenylene | 70 |
| Halogenated fluorocarbon | 30 |

The composite is prepared as in Example VIII, above.

EXAMPLE XI

| | Percent |
|---|---|
| Composition 412 polyphenylene | 70 |
| Polychlorotrifluoroethylene powder | 30 |

The composite is prepared as in Example VIII, above.

EXAMPLE XII

| | Percent |
|---|---|
| Composition 414 polyphenylene | 60 |
| Polytetrafluoroethylene powder | 40 |

The composite is prepared as in Example VIII, above.

The results of numerous sequential LFW-1 friction tests using RING: 17-4PH (H-900), under the weight and conditions indicated, on the formed lubricant composite Example VIII are illustrated in the graphs of FIGS. 1, 2, and 3.

The following tables, in correlation with the indicated graphs, are friction test data showing the coefficient of friction ($f_k$) of the composite of cured molded bearings of the composition of Example VIII, above:

TABLE I

| | Speed of oscillation in c.p.m. (nominal) | | | | | |
|---|---|---|---|---|---|---|
| | 2 | 5 | 10 | 25 | 50 | 90-95 |
| | $F_k$ (lbs.)/$f_k$ | $F_k$ (lbs.)/$f_k$ | $F_k$ (lbs.)/$f_k$ | $F_k$ (lbs.)/$f_k$ | $F_k$ (lbs.)/$f_k$ | $F_k$ (lbs.)/$f_k$ |
| Load p.s.i.: | | | | | | |
| 205 | 3.1/0.103 | 3.1/0.103 | 3.3/0.110 | 3.4/0.113 | 3.5/0.117 | 3.6/0.120 |
| 820 | 12.8/0.107 | 13.4/0.112 | 13.8/0.115 | 13.8/0.115 | 13.5/0.113 | 12.8/0.107 |
| 1,435 | 21.9/0.104 | 23.8/0.114 | 23.8/0.114 | 23.1/0.110 | 21.9/0.104 | 20.6/0.098 |
| 2,050 | | 31.3/0.104 | 32.5/0.108 | 30.7/0.103 | 29.4/0.098 | 28.1/0.094 |

NOTE.—Ring=17-4PH (H-900) (−1); Lubricant=None; Test sequence=2d; L.P. block=Composition "D" (HAC-70% P.P.P. and 30% Teflon); Lubricant=Self-lubricating material; LFW-1 Test No. 238, date 11-30-67.

TABLE II

| | Speed of oscillation in c.p.m. (nominal) | | | | | |
|---|---|---|---|---|---|---|
| | 2 | 5 | 10 | 25 | 50 | 90-95 |
| | $F_k$ (lbs.)/$f_k$ | $F_k$ (lbs.)/$f_k$ | $F_k$ (lbs.)/$f_k$ | $F_k$ (lbs.)/$f_k$ | $F_k$ (lbs.)/$f_k$ | $F_k$ (lbs.)/$f_k$ |
| Load, p.s.i.: | | | | | | |
| 205 | 2.6/0.087 | 3.1/0.103 | 3.3/0.110 | 3.6/0.120 | 3.9/0.130 | 4.0/0.133 |
| 820 | 11.9/0.099 | 12.2/0.102 | 12.8/0.107 | 13.8/0.115 | 14.4/0.120 | 14.7/0.123 |
| 1,435 | 21.3/0.101 | 21.9/0.104 | 22.5/0.107 | 23.1/0.110 | 23.8/0.113 | 23.1/0.110 |
| 2,050 | | 31.3/0.104 | 31.9/0.106 | 31.9/0.106 | 32.5/0.108 | 31.9/0.106 |

NOTE.—Ring=17-4PH (H-900) (−1); Lubricant=None; Test sequence=2nd; L.P. block=Composition "D" (HAC-70% P.P.P. and 30% Teflon); Lubricant=Self-lubricating material; LFW-1 Test No. 238, date 11-30-67.

TABLE III

| | Speed of oscillation in c.p.m. (nominal) | | | | | |
|---|---|---|---|---|---|---|
| | 2 | 5 | 10 | 25 | 50 | 90-95 |
| | $F_k$ (lbs.)/$f_k$ | $F_k$ (lbs.)/$f_k$ | $F_k$ (lbs.)/$f_k$ | $F_k$ (lbs.)/$f_k$ | $F_k$ (lbs.)/$f_k$ | $F_k$ (lbs.)/$f_k$ |
| Load, p.s.i.: | | | | | | |
| 205 | 3.6/0.120 | 3.6/0.120 | 3.6/0.120 | 4.0/0.133 | 4.3/0.143 | 4.3/1.143 |
| 820 | 13.1/0.109 | 13.5/0.113 | 13.8/0.115 | 14.4/0.120 | 15.0/0.125 | 15.3/0.127 |
| 1,435 | 22.5/0.107 | 23.1/0.110 | 23.7/0.113 | 23.8/0.114 | 24.4/0.116 | 24.4/0.116 |
| 2,050 | | 31.3/0.104 | 32.5/0.108 | 33.1/0.111 | 33.1/0.111 | 32.5/0.108 |
| 3,280 | | 48.8/0.102 | 48.8/0.102 | 46.3/0.096 | 43.7/0.091 | 43.7/0.091 |

NOTE.—Ring=17-4PH (H900) (−1); Lubricant=None; Test sequence=3d; L.P. block=Composition "D" (HAC-70% P.P.P. and 30% Teflon); Lubricant=Self-lubricating material; LFW-1 Test No. 238, date 11-30-67.

As an exemplified in the graphs of FIGS. 1, 2 and 3, the effect of load and speed on friction provides improved efficiency in comparison to the best known standard conventional solid lubricant composite (polytetrafluoroethylene, fiber glass/$MoS_2$) as evidenced by comparative similar test illustrated by FIG. 4.

Illustrative of a polyphenylene composite with multiple lubricant is the following:

EXAMPLE XIII

A mixture of 70% composition 412
20% Teflon powder (polytetrafluoroethylene)
and 10% $MoS_2$ was prepared by mixing and curing as in Example VIII, above Similar testing results showed comparable improved bearing efficiency as shown in FIG. 5. The polytetrafluoroethylene may be in fiber form in admixture with the dry lubricant solid, and illustrative of the reinforcing or lubricant fiber material as hereinafter indicated.

Another lubricant preparation illustrative of the improved bearings as provided herein are demonstrated by the following:

EXAMPLE XIV

A mixture of 70% Composition 913 and 30% Teflon powder was prepared by mixing and curing as in Example VIII, above. The dried composite may be molded in this form. The composite was also blended by ball milling and milling on a rubber mill with care taken not to advance the resin beyond a moldable state. In addition, in the case where the mixture is to be used for spray or dip application, the temperature and milling time are controlled to maintain solubility. Usually, the temperature may be ambient or in a range up to and not over about 200° C. The curing agent is the primary control factor, as in use of a polymethylol curing agent, in milling, the temperature should not be over 150° C. whereas with the polysulfonyl halides, the temperature may be up to about 200° C.

EXAMPLE XV

A mixture of 70% by weight 412 and 30% powdered molybdenum disulfied ($MoS_2$) was prepared in the manner of Example VIII and molded as a bushing or ball bearing retainer. As such, this composition or combination shows excellent bearing wear and reduced friction properties.

Molded bearings of the powdered polyphenylene composite of composition 412 and $MoS_2$ (70/30 ratio), blended and molded in bearing form, as indicated, when tested by LFW ring (17-4 PH H-900) and low pressure block, under the pressures indicated, provided the improved consistency of efficiency illustrated in FIGS. 6, 7, 8, and 9, with results supported by the following data of Tables IV, V, and VI.

EXAMPLE XVI

A mixture of 50% composition 412

25% Teflon fibers (polytetrafluoroethylene)
15% $MoS_2$
and 10% fiber glass prepared as in Example VIII

TABLE IV

| Load, p.s.i.: | Speed of oscillation in c.p.m. (nominal) | | | | | |
|---|---|---|---|---|---|---|
| | 2 | 5 | 10 | 25 | 50 | 90-95 |
| | $F_k$ (lbs.)/$f_k$ | $F_k$ (lbs.)/$f_k$ | $F_k$ (lbs.)/$f_k$ | $F_k$ (lbs.)/$f_k$ | $F_k$ (lbs.)/$f_k$ | $F_k$ (lbs.)/$f_k$ |
| 205 | 4.5/0.150 | 4.9/0.163 | 5.0/0.167 | 5.3/0.177 | 5.6/0.187 | 6.0/0.200 |
| 820 | 22.5/0.188 | 23.7/0.198 | 26.9/0.224 | 27.5/0.229 | 28.8/0.240 | 28.8/0.240 |
| 1,435 | | 46.3/0.225 | 53.8/0.256 | 55.0/0.232 | 53.8/0.256 | 51.3/0.244 |
| 2,050 | | 87.5/0.291 | 88.8/0.296 | 77.5/0.292 | 80.0/0.267 | 72.5/0.242 |

Note.—Ring=17-4PH (H-900); Lubricant=None; Test sequence=1st; L.P. block= ABCHAR 412-MoS₂ (70-30); Lubricant=MoS₂; LFW-1 Test No. 245, date 2-1-68.

TABLE V

| Load, p.s.i.: | Speed of oscillation in c.p.m. (nominal) | | | | | |
|---|---|---|---|---|---|---|
| | 2 | 5 | 10 | 25 | 50 | 90-95 |
| | $F_k$ (lbs.)/$f_k$ | $F_k$ (lbs.)/$f_k$ | $F_k$ (lbs.)/$f_k$ | $F_k$ (lbs.)/$f_k$ | $F_k$ (lbs.)/$f_k$ | $F_k$ (lbs.)/$f_k$ |
| 205 | 8.3/0.276 | 8.6/0.287 | 8.9/0.297 | 9.3/0.310 | 9.3/0.310 | 9.3/0.310 |
| 820 | | 36.9/0.307 | 37.5/0.313 | 38.1/0.317 | 37.5/0.313 | 36.9/0.307 |
| 1,435 | | 66.3/0.315 | 67.5/0.321 | 66.3/0.315 | 63.7/0.303 | 58.7/0.280 |
| 2,050 | | 9.65/0.312 | 96.8/0.323 | 88.2/0.294 | 81.3/0.271 | 73.8/0.246 |

Note.—Ring=17-4PH (H-900); Lubricant=None; Test sequence=2nd; L.P. block= ABCHAR 412-MoS₂ (70-30); Lubricant=MoS₂; LFW-1 Test No. 245, date 2-1-68.

TABLE VI

| Load, p.s.i.: | Speed of oscillation in c.p.m. (nominal) | | | | | |
|---|---|---|---|---|---|---|
| | 2 | 5 | 10 | 25 | 50 | 90-95 |
| | $F_k$ (lbs.)/$f_k$ | $F_k$ (lbs.)/$f_k$ | $F_k$ (lbs.)/$f_k$ | $F_k$ (lbs.)/$f_k$ | $F_k$ (lbs.)/$f_k$ | $F_k$ (lbs.)/$f_k$ |
| 205 | 9.6/0.320 | 9.8/0.326 | 10.0/0.333 | 10.3/0.346 | 10.1/0.338 | 9.8/0.326 |
| 820 | | 40.6/0.339 | 41.3/0.346 | 41.3/0.346 | 40.0/0.333 | 38.2/0.318 |
| 1,435 | | 72.5/0.345 | 72.5/0.345 | 70.0/0.333 | 65.0/0.309 | 56.3/0.268 |
| 2,050 | | 100.0/0.333 | 97.5/0.325 | 84.2/0.281 | 80.0/0.267 | 70.0/0.233 |
| 3,280 | | | | 147.5/0.307 | 131.5/0.274 | 109./0.228 | 93.8/0.196 |
| 4,305 | | | 190.5/0.303 | 169.0/0.268 | 150.0/0.248 | 137.5/0.218 | 125.0/0.198 |

Note.—Ring=17-4 PH (H-900); Lubricant=None; Test sequence=3rd; L.P. block= BCHAR 412-MoS₂ (70-30); Lubricant=MoS₂; LFW-1 Test No. 245, date 2-1-68.

In illustrating the application of the polyphenylene matrix and lubricant as a spray or dip coating, the following composition and method is described:

EXAMPLE XVII

A mixture of 100 parts of composition 412 dissolved in a solvent, for example, dimethyl formamide, was blended with 450 parts of finely divided MoS₂ (molybdenum disulfide) and sprayed onto test specimens for both the LFW-1 Tester (17–4 PH, H900 rings and low-pressure blocks) and the Falex Tester (mild steel pin and V-blocks). The coatings were spray-applied approximately 0.0005-inch thick on all speciments, and were cured by baking first for an hour in air at 275° F. followed by two hours in air at 550° F.

As will be recognized, the above composition may be prepared utilizing other suitable solvent material with the same or other lubricant in a relative proportion, as desired. In addition, the mixture may contain reinforcing and lubricative fibers, as indicated.

Figure 10:
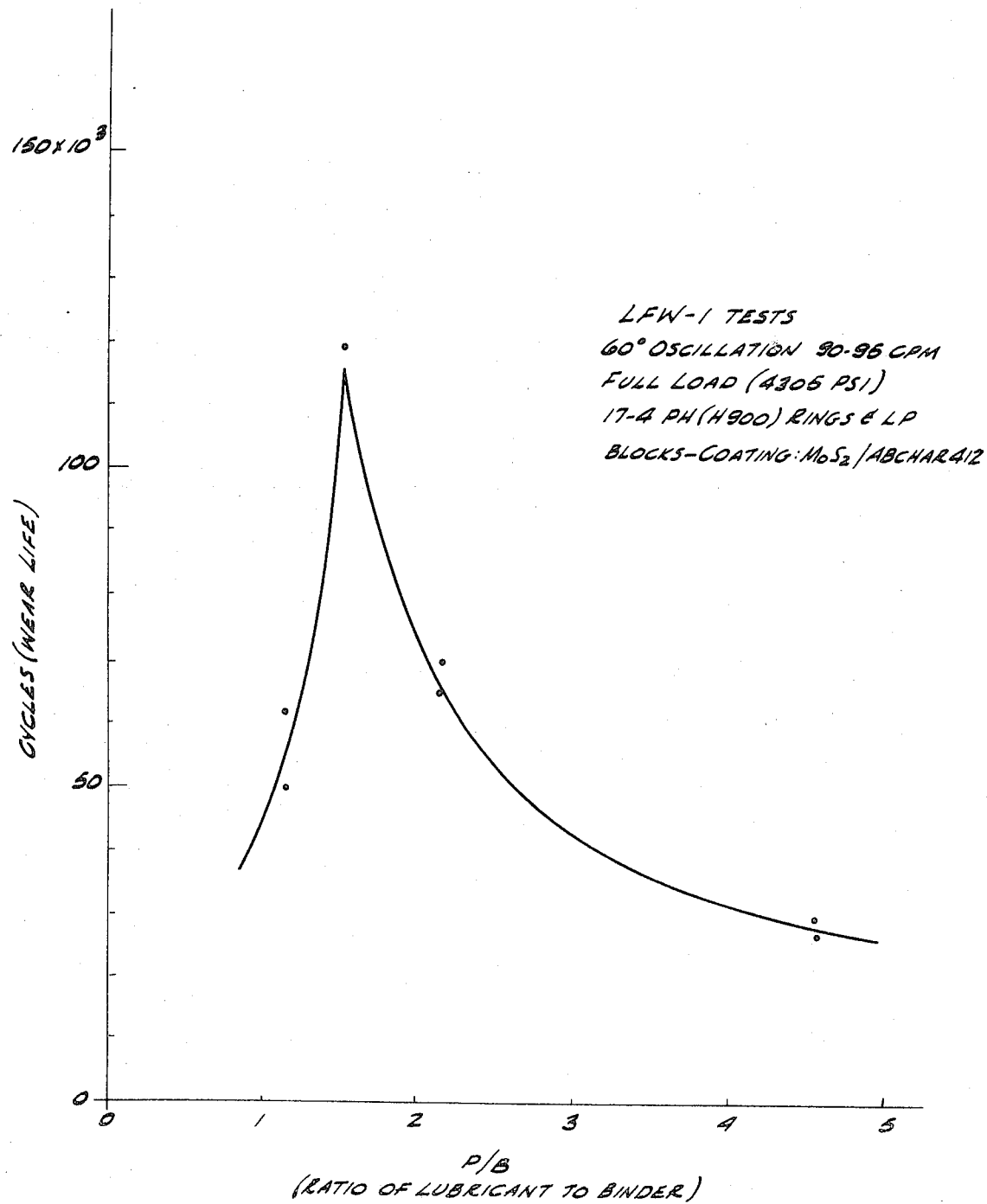
FIGS. 10 and 11 are additional graphs illustrating a preferred ratio of a spray pigment-to-binder utilizing polymerized polyphenylene-lubricant powder complex.
Figure 11:
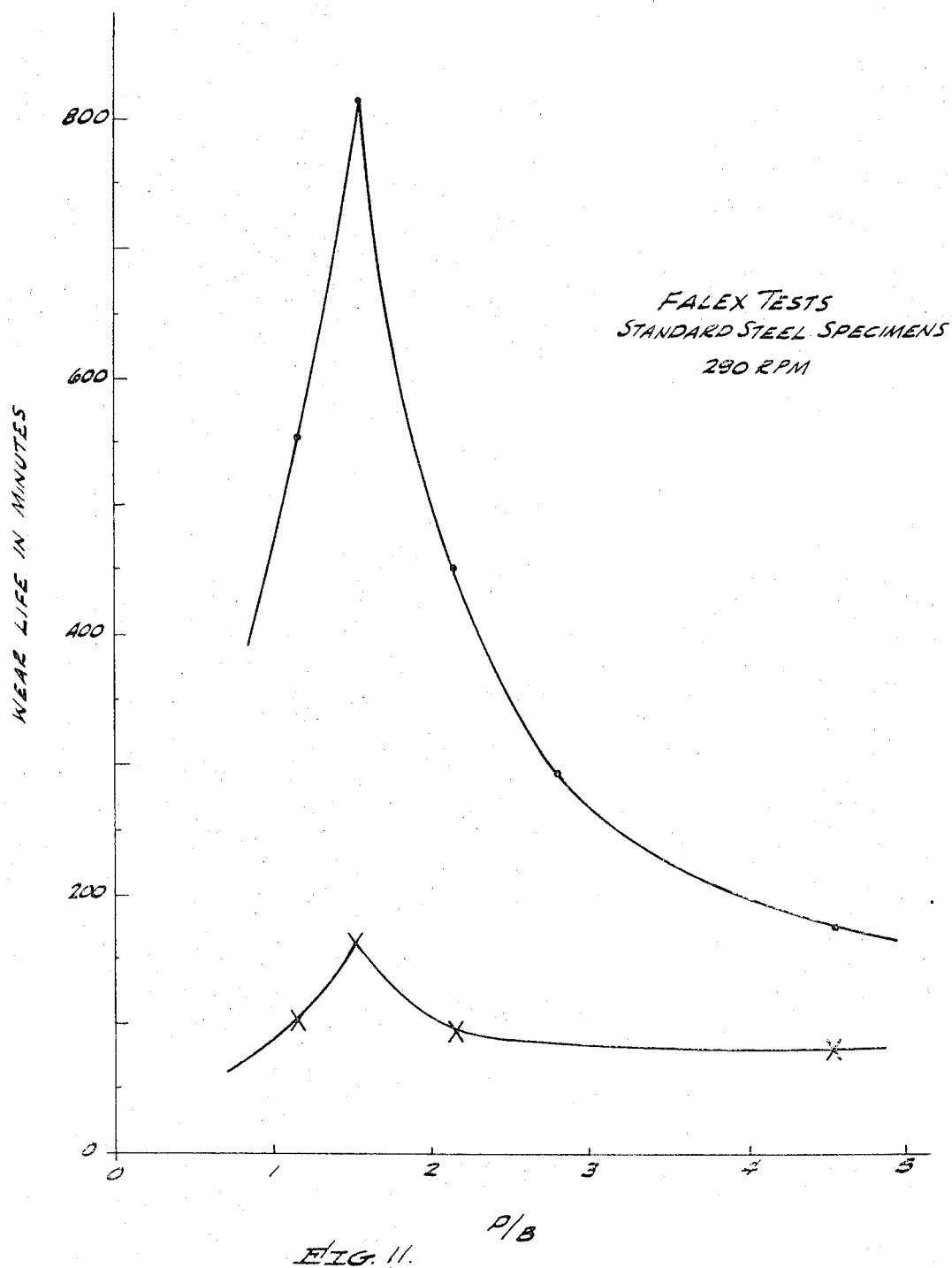

As illustrated by FIGS. 10 and 11, the minimum-maximum ratio of lubricative pigment to binder in a spray application is between 1-1 and 5-1 and preferably with pigment to binder ratio between 1.25 to 2.25 to 1, wherein optimum results were achieved as indicated in the graphs. The points on the graphs were obtained from measuring the wear life of mixtures with the above range 0 to 4.5 to 1 lubricant to binder. The optimum ratio, in a spray of lubricant/binder composition, is found to be about 1.5 to 1.

Having described the present embodiments of our discoveries in accordance with the patent statutes, it will now be apparent that some modifications and variations may be made without departing from the spirit and scope thereof. The specific embodiments described are provided by way of illustration and are illustrative of our discovery, invention or improvements which are to be limited only by the terms of the appended claims.

What is claimed is:

1. A thermoset product comprising lubricative particulates bonded by heat-cured polyphenylene.

2. A product of claim 1 wherein the heat cured matrix of polyphenylene is prepared from a mixture comprising a soluble, fusible polyphenylene having a molecular weight from about 500 to about 3000 and a curing agent.

3. A product of claim 2 wherein the fusible polyphenylene has a carbon content of at least 94%.

4. A product of claim 2 wherein the curing agent is a combination of an aromatic polymethylol compound with an acid catalyst.

5. A product of claim 2 wherein the curing agent is an aromatic polysulfonic acid.

6. A product of claim 2 wherein the curing agent is an aromatic sulfonyl chloride.

7. A product of claim 2 wherein the curing agent is an aromatic compound having both a sulfonic acid group and a sulfonyl halide group.

8. A product of claim 2 wherein the curing agent is a mixture of an aromatic polysulfonic acid and an aromatic polysulfonyl halide.

9. A product of claim 2 wherein the solid lubricant is a thermally stable solid fluorocarbon, graphite, or a metal dichalcogenide.

10. A product of claim 9 wherein the metal dichalcogenide is MoS₂, MoSe₂, WS₂, WSe₂, Sb₂O₃, or PbS.

11. A product of claim 9 wherein the mixture contains reinforcing fibers.

12. A product of claim 11 wherein the fibers are lubricative fibers.

References Cited

UNITED STATES PATENTS

| 3,285,850 | 11/1966 | Graham | 252—12 X |
| 3,433,742 | 3/1969 | Banta | 252—12 |
| 3,453,208 | 7/1969 | Gallagher et al. | 252—12 |
| 3,480,547 | 11/1969 | Van Dyk | 252—12.6 |

CARL F. DEES, Primary Examiner

U.S. Cl X.R.

252—12